(12) United States Patent
Kong et al.

(10) Patent No.: US 6,606,855 B1
(45) Date of Patent: Aug. 19, 2003

(54) PLASMA REFORMING AND PARTIAL OXIDATION OF HYDROCARBON FUEL VAPOR TO PRODUCE SYNTHESIS GAS AND/OR HYDROGEN GAS

(75) Inventors: Peter C. Kong, Idaho Falls, ID (US); Brent A. Detering, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/590,537

(22) Filed: Jun. 8, 2000

Related U.S. Application Data
(60) Provisional application No. 60/138,074, filed on Jun. 8, 1999.

(51) Int. Cl.$^7$ ................................................ F01N 3/00
(52) U.S. Cl. ............................. 60/275; 60/274; 60/283; 123/3; 123/DIG. 12; 422/186; 422/186.2
(58) Field of Search .......................... 60/274, 275, 278; 283/286, 301; 123/DIG. 12, 518, 520; 1/3, 568.15; 219/121, 121.36; 75/10.19; 422/169, 186, 186.04, 186.2; 423/210

(56) References Cited

U.S. PATENT DOCUMENTS

| | | | | |
|---|---|---|---|---|
| 3,986,350 A | * | 10/1976 | Schmidt | 60/274 |
| 4,469,932 A | | 9/1984 | Spielberg et al. | |
| 4,625,681 A | | 12/1986 | Sutekiyo | |
| 4,735,186 A | * | 4/1988 | Parsons | 123/3 |
| 4,982,715 A | * | 1/1991 | Foster | 123/518 |
| 5,207,734 A | * | 5/1993 | Day et al. | 60/278 |
| 5,343,699 A | * | 9/1994 | McAlister | 60/273 |
| 5,379,728 A | * | 1/1995 | Cooke | 123/3 |
| 5,388,558 A | * | 2/1995 | Plapp et al. | 123/568.15 |

(List continued on next page.)

OTHER PUBLICATIONS

"Plasma Processing and Synthesis of Materials III," *Materials Research Society Symposium Proceedings*, vol. 190, 1991, pp. 78–82.

Wyszynski, W. T., "Concept of On–Board Fuel Reforming," $2^{nd}$ *International Conference on Combustion & Emissions Control*, Dec. 3, 1995, Institute of Energy, London, UK.

"Soaring Palladium Price Underscores Importance of Litex Auto Emission–Reduction Technology" Detroit Mar. 6, 2000.

"Hydrogen A Go–Go", *The Tenth Annual Discover Magazine Awards for Technological Innovation*, Discover Magazine, Jul. 2000.

Chandler, D. L., "Device may spark clean–running cars", *The Boston Globe*, City Edition, p. E1, Copyright 1999.

"MIT device could lead to near–term environmental improvement for cars", *MIT News*, Oct. 23, 1997.

*Primary Examiner*—Thomas Denion
*Assistant Examiner*—Tu M. Nguyen
(74) *Attorney, Agent, or Firm*—Workman Nydegger & Seeley

(57) ABSTRACT

Methods and systems for treating vapors from fuels such as gasoline or diesel fuel in an internal combustion engine, to form hydrogen gas or synthesis gas, which can then be burned in the engine to produce more power. Fuel vapor, or a mixture of fuel vapor and exhaust gas and/or air, is contacted with a plasma, to promote reforming reactions between the fuel vapor and exhaust gas to produce carbon monoxide and hydrogen gas, partial oxidation reactions between the fuel vapor and air to produce carbon monoxide and hydrogen gas, or direct hydrogen and carbon particle production from the fuel vapor. The plasma can be a thermal plasma or a non-thermal plasma. The plasma can be produced in a plasma generating device which can be preheated by contact with at least a portion of the hot exhaust gas stream, thereby decreasing the power requirements of the plasma generating device.

15 Claims, 2 Drawing Sheets

U.S. PATENT DOCUMENTS

| | | | |
|---|---|---|---|
| 5,425,332 A | * | 6/1995 | Rabinovich et al. ............ 123/3 |
| 5,435,274 A | | 7/1995 | Richardson, Jr. |
| 5,437,250 A | * | 8/1995 | Rabinovich et al. ............ 123/3 |
| 5,711,147 A | | 1/1998 | Vogtlin et al. |
| 5,715,677 A | * | 2/1998 | Wallman et al. ............... 60/275 |
| 5,746,051 A | | 5/1998 | Kieser et al. |
| 5,746,984 A | * | 5/1998 | Hoard ......................... 422/169 |
| 5,749,937 A | | 5/1998 | Caren et al. |
| 5,807,466 A | | 9/1998 | Wang et al. |
| 5,826,548 A | | 10/1998 | Richardson, Jr. |
| 5,847,353 A | | 12/1998 | Titus et al. |
| 5,863,413 A | | 1/1999 | Detering et al. |
| 5,887,554 A | * | 3/1999 | Cohn et al. .......... 123/DIG. 12 |
| 5,893,267 A | * | 4/1999 | Vogtlin et al. ................. 60/275 |
| 5,899,175 A | | 5/1999 | Manikowski, Jr. et al. |
| 5,935,293 A | | 8/1999 | Detering et al. |
| 5,993,761 A | | 11/1999 | Czernichowski et al. |
| 6,003,305 A | | 12/1999 | Martin et al. |
| 6,029,442 A | | 2/2000 | Caren et al. |
| 6,038,853 A | | 3/2000 | Penetrante et al. |
| 6,092,512 A | | 7/2000 | Ma ........................ 123/568.15 |
| 6,122,908 A | | 9/2000 | Wirmark |
| 6,176,078 B1 | * | 1/2001 | Balko et al. .................. 60/275 |

\* cited by examiner

PLASMA REFORMING AND PARTIAL OXIDATION OF HYDROCARBON FUEL VAPOR TO PRODUCE SYNTHESIS GAS AND/OR HYDROGEN GAS

RELATED APPLICATION

This application claims priority from U.S. provisional application Ser. No. 60/138,074, filed Jun. 8, 1999, and is incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates to methods of using hydrocarbon fuel vapor or hydrocarbon fuel vapor mixed with engine exhaust and/or air to form hydrogen and/or carbon monoxide. In particular, the present invention provides plasma-assisted reactions to produce hydrogen and/or carbon monoxide gases which can then be consumed in an internal combustion engine to enhance engine performance and reduce engine pollution.

2. Relevant Technology

Optimizing fuel efficiency and pollutant reduction are difficult tasks for internal combustion engines. Engine efficiency and fuel utilization increase with excess oxygen in the combustion chamber, i.e., under fuel lean conditions. At the same time, however, production of nitrogen oxides ("$NO_x$"), sulfur oxides ("$SO_x$"), and other pollutants also increase under fuel lean conditions. As the relative amount of oxygen decreases, pushing the combustion system toward fuel rich conditions, the pollutant production decreases, but fuel utilization and thus engine efficiency also decrease. Thus, it would be advantageous to operate the combustion system under fuel lean conditions to increase engine efficiency, if ways could be found to decrease or prevent $NO_x$ and $SO_x$ emissions.

Conventional attempts at decreasing pollutant emissions typically focus on improving the quality of the hydrocarbon fuel, or removing pollutants from the exhaust gases. Purifying fuels of sulfur- and nitrogen-containing compounds reduces the amount of sulfur and nitrogen available to form $NO_x$ and $SO_x$ pollutants. However, such purification is expensive and often impractical, and cannot affect the production of $NO_x$ from nitrogen in the combustion air. Downstream purification techniques, such as catalytic converters, are limited in the amount of pollutants they can remove due to temperature and air-to-fuel ratio constraints, and recent effort has focused on supplementing catalytic converters in exhaust gas purification. For example, U.S. Pat. No. 6,029,442 discloses a method of purifying the exhaust gas stream by introducing radicals into the exhaust gas stream. The exhaust gas stream, or a diverted portion of the exhaust gas stream, is passed through a corona discharge to form oxidizing radicals, such as hydroxyl radicals, from water in the exhaust gas. The oxidizing radicals then reportedly react with pollutant species in the exhaust gases to decrease the concentration of pollutants emitted. Similarly, U.S. Pat. No. 5,863,413 discloses a method of treating exhaust gases or precombustion gases with hydroxyl radicals to reduce pollutant emission.

These conventional pollutant reduction methods increase the cost and complexity of the combustion systems, without increasing the overall efficiency, power, or fuel utilization. Moreover, these methods primarily focus on decreasing the amount of pollutants after the pollutants have formed, and do not address the problem of initial pollutant formation.

Thus, there is a need for methods which overcome the deficiencies of the prior art.

SUMMARY AND OBJECTS OF THE INVENTION

It is an object of the present invention to provide methods of increasing fuel efficiency in internal combustion engines.

It is another object of the present invention to provide methods of reducing the output of nitrogen oxides, sulfur oxides, and other pollutants from internal combustion engines.

It is another object of the present invention to provide methods of forming synthesis gas from hydrocarbon fuel vapor mixtures.

It is another object of the present invention to provide methods of directly producing hydrogen gas from hydrocarbon fuel vapors.

In one method of the present invention, fuel vapor in an internal combustion engine is reformed to produce synthesis gas, i.e., carbon monoxide and hydrogen. Liquid hydrocarbon fuel is combusted in an internal combustion engine having a combustion chamber and a fuel tank adapted to provide liquid hydrocarbon fuel to the combustion chamber, thereby forming a hot exhaust gas stream. The exhaust gas stream, which includes carbon dioxide and water, is directed to exit the combustion chamber. A starting gas mixture, comprising a first portion of the exhaust gas stream and a stream of hydrocarbon fuel vapor, is contacted with a plasma, which promotes a reforming reaction between the fuel vapor and the exhaust gas to form a product gas mixture including carbon monoxide and hydrogen. The product gas mixture can be directed into the combustion chamber and burned to produce more power. Preferably, the plasma is produced and contained in a plasma generating device which can be preheated by contact with a second portion of the hot exhaust gas stream.

In another method of the present invention, fuel vapor in an internal combustion engine is partially oxidized to produce carbon monoxide and hydrogen. Liquid hydrocarbon fuel is combusted in an internal combustion engine having a combustion chamber and a fuel tank adapted to provide liquid hydrocarbon fuel to the combustion chamber, thereby forming a hot exhaust gas stream. The hot exhaust gas stream is directed to exit the combustion chamber. A starting gas mixture, comprising air and a stream of hydrocarbon fuel vapor, is contacted with a plasma, which promotes a partial oxidation reaction between the fuel vapor and air to form a product gas mixture including carbon monoxide and hydrogen. The product gas mixture can be directed into the combustion chamber and burned to produce more power. Preferably, the plasma is contained in a plasma generating device which can be preheated by contact with at least a portion of the hot exhaust gas stream. The hydrocarbon fuel vapor and air are preferably preheated in a heat exchanger, the heat exchanger being heated by contact with at least a portion of the hot exhaust gas stream.

In another method of the present invention, fuel vapor in an internal combustion engine is plasma-treated to directly produce hydrogen gas, along with solid carbon particles and hydrocarbon gases. Liquid hydrocarbon fuel is combusted in an internal combustion engine having a combustion chamber and a fuel tank adapted to provide liquid hydrocarbon fuel to the combustion chamber, thereby forming a hot exhaust gas stream. The hot exhaust gas stream is directed to exit the combustion chamber. A stream of hydrocarbon fuel vapor is contacted with a plasma to form a product mixture including hydrogen gas, solid carbon particles, and various hydrocarbon gases. The product mixture can be directed into the combustion chamber and burned to produce more power. The hydrocarbon fuel vapor is preferably preheated in a heat exchanger, the heat exchanger being heated by contact with at least a portion of the hot exhaust gas stream.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE INVENTION

The present invention is directed to methods of treating vapors from fuels such as gasoline or diesel fuel in an internal combustion engine, to form hydrogen gas or synthesis gas, which can then be burned in the engine to produce more power. Fuel vapor, or a mixture of fuel vapor and exhaust gas and/or air, is contacted with a plasma, to promote reforming reactions between the fuel vapor and exhaust gas to produce carbon monoxide and hydrogen gas, partial oxidation reactions between the fuel vapor and air to produce carbon monoxide and hydrogen gas, or direct hydrogen and carbon particle production from the fuel vapor. The plasma can be a thermal plasma or a non-thermal plasma. Preferably, the plasma is produced and contained in a plasma generating device which can be preheated by contact with at least a portion of the hot exhaust gas stream, thereby decreasing the power requirements of the plasma generating device.

Figure 1:
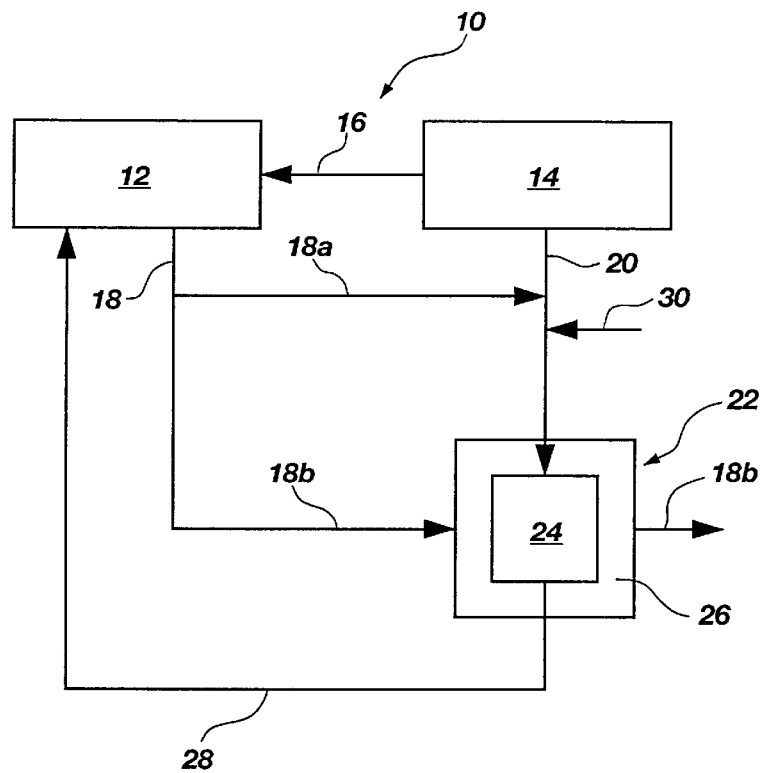
FIG. 1 is a schematic representation of a system and method according to the present invention, wherein fuel vapor and engine exhaust gases are reformed to produce carbon monoxide and hydrogen gas.

In one method of the present invention, fuel vapor in an internal combustion engine is reformed to produce synthesis gas, i.e., carbon monoxide and hydrogen. Referring now to FIG. 1, a schematic diagram of a system and method of the present invention is shown. An internal combustion engine 10 includes a combustion chamber 12 adapted to combust a liquid hydrocarbon fuel, and a fuel tank 14 adapted to deliver liquid hydrocarbon fuel 16 to combustion chamber 12. The internal combustion engine 10 can be a conventional internal combustion engine, such as is found in cars, buses, trucks, boats, ships, trains, electrical power generators, and the like. The engine can be adapted to burn any conventional liquid hydrocarbon fuel, such as gasoline or diesel fuel.

The liquid hydrocarbon fuel 16 is combusted in combustion chamber 12, thereby forming a hot exhaust gas stream 18. The exhaust gas stream 18, which includes carbon dioxide and water, is directed to exit the combustion chamber. A first portion of the exhaust gas stream 18a and a stream of hydrocarbon fuel vapor 20 are mixed together and introduced into a plasma generating device 22. The hydrocarbon fuel vapor 20 can be taken from fuel tank 14, where the gaseous hydrocarbon fuel is present at an equilibrium vapor pressure above the liquid hydrocarbon fuel. Alternatively, a portion of the liquid hydrocarbon fuel can be taken from fuel tank 14 and vaporized by heating, to produce a hydrocarbon fuel vapor.

The plasma generating device 22 includes an inner plasma chamber 24 adapted to form a plasma. Preferably, plasma generating device 22 also includes an outer housing 26 adapted to receive heating means for preheating the inner plasma chamber 24. The heating means can be, for example, an electrical resistance heater, or other heating devices known to those skilled in the art. As shown in FIG. 1, however, it is particularly preferred that the outer housing 26 be heated by receiving a second portion of the hot exhaust gas stream. Thus, hot exhaust gas stream 18b is directed into housing 26 to preheat inner plasma chamber 24, then is allowed to exit plasma generating device 22.

The plasma chamber 24 can be adapted to produce a thermal plasma or a non-thermal plasma. A plasma is made up of electrons, ionized or multiply-ionized gas atoms or molecules, and un-ionized molecular or atomic species. In the bulk phase, a plasma is electrically neutral. Plasmas of different temperatures and chemical composition can be prepared by various means well-known in the art, such as by bombarding a gas stream with high energy electrons or UV radiation, passing a gas stream through an electric arc, or passing a gas stream through a non-arcing high-voltage field. Depending upon how the plasma is formed, the plasma can be characterized as "thermal" or "non-thermal".

A thermal plasma is a plasma in which the kinetic temperature of the electrons is approximately equal to the kinetic temperature of the remaining species—the various atoms, ions, radicals, and other species, collectively referred to as the "heavy particles". This thermal equilibrium is typically achieved when the extent of ionization is large, and at very high temperatures, typically greater than about 2000 K, and often far higher. A thermal plasma is easily created by passing a gas an electric arc discharge. The electric arc will rapidly heat the gas by resistive and radiative heating to very high temperatures within microseconds of passing through the arc. The thermal plasma is typically luminous at temperatures above about 9,000 K. A thermal plasma can be produced with virtually any gas in this manner. In particular, the gas forming the plasma can be a neutral gas, such as argon, helium or neon; a reductive gas, such as hydrogen, methane, ammonia, or carbon monoxide; or an oxidative gas, such as oxygen, nitrogen, or carbon dioxide. In the methods of the present invention, the plasma gas is advantageously a hydrocarbon fuel vapor, or a mixture of a hydrocarbon fuel vapor with air and/or engine exhaust gases. The details of thermal plasma generating torches are well known and need not be further detailed within this disclosure to make the present invention understandable to those skilled in the art.

In contrast to thermal plasmas, wherein the electrons and heavy particles are in thermal equilibrium, a non-thermal plasma is characterized by an electron temperature and a heavy particle temperature that can differ by several orders of magnitude. In a non-thermal plasma, the relatively low degree of ionization impedes equilibration between the high-energy, high mobility electrons, and the heavy particles, resulting in an electron temperature far greater than the heavy particle temperature. Because of the low electron mass, the contribution of the high electron temperature to the overall gas temperature is very small, giving the non-thermal plasma a gas temperature of about room temperature. Non-thermal plasmas are readily produced by passing a plasma gas through a high voltate electric field, such as, for example, high voltage electrodes separated by space for gas passage and a dielectric material. Devices for producing a non-thermal plasma, also referred to as silent discharge devices or corona discharge devices, are well-known in the art. Various such devices are described, for example, in U.S. Pat. No. 6,029,442, the disclosure of which is incorporated herein by reference. Like a thermal plasma, a non-thermal plasma can be produced using a wide variety of gases, and in particular, using hydrocarbon fuel vapor and hydrocarbon fuel vapor mixtures.

Either type of plasma generating device, a thermal plasma device or a non-thermal plasma device, can be designed for DC or AC operation. Since a non-thermal plasma device operates at ambient temperatures, it is advantageous to pre-heat the non-thermal plasma device and/or the fuel vapor or fuel vapor mixture, preferably using the hot engine exhaust gas. The fuel vapor can be preheated by mixing with the hot engine exhaust gas 18a, or in a heat exchanger (not shown) heated by a portion of the hot engine exhaust gas. A non-thermal plasma device does not generate an excessive amount of heat, so that cooling of the device is not required. In the case of a thermal plasma device, the significant heat generated by the device can be dissipated using conventional means, not shown, such as recirculating liquid coolants.

The plasma, whether thermal or non-thermal, promotes a reforming reaction between the fuel vapor and the exhaust gas, to form a mixture of carbon monoxide and hydrogen gas, also known as synthesis gas or syn-gas. The synthesis gas 28 can be directed back into combustion chamber 12 for combustion. The synthesis gas can react with excess oxygen in the combustion chamber, thus counteracting the tendency of excess oxygen to produce nitrogen oxides and sulfur oxides and acting as a sequestering agent. This sequestering agent functionality has several important advantages. First, excess oxygen can be used in the air/fuel mixture to increase combustion efficiency. Second, hydrogen and carbon monoxide react with excess oxygen in the combustion chamber, thus making oxygen unavailable to react with nitrogen and sulfur in the combustion chamber and downstream exhaust. Third, the sequestering reactions release heat, which increases engine power output. Fourth, sequestering agents can also be injected downstream of the combustion chamber at the completion of the combustion cycle in the engine. This downstream injection, not shown in FIG. 1, further prevents pollutant formation in the hot exhaust gases. Thus, this method effectively re-combusts engine exhaust gases by reforming them to a combustible and oxygen-sequestering synthesis gas, resulting advantageously in less emitted pollution and more efficient fuel usage.

In the absence of sufficient oxygen, the plasma reaction can also produce ultrafine particles of solid carbon. Thus, if desired, air 30 can be added to the exhaust stream 18a and/or the hydrocarbon fuel stream 20, as needed to optimize production of synthesis gas and minimize carbon production.

Figure 2:
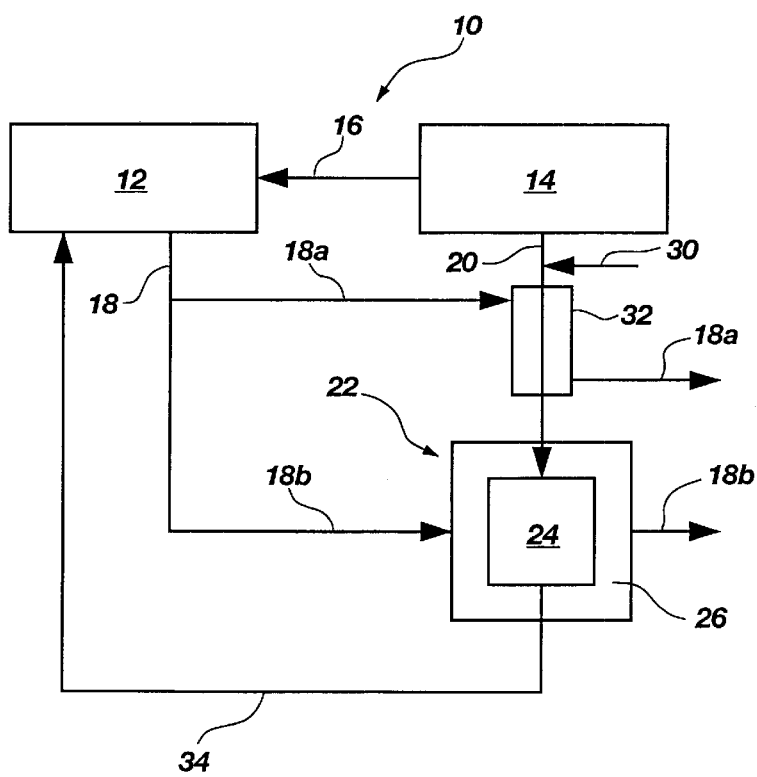
FIG. 2 is a schematic representation of a system and method according to the present invention, wherein fuel vapor is partially oxidized with air to produce carbon monoxide and hydrogen gas.

In another method of the present invention, fuel vapor in an internal combustion engine is partially oxidized to produce carbon monoxide and hydrogen. Referring now to FIG. 2, wherein like components use the same reference numerals as in FIG. 1, exhaust gas stream 18a of engine exhaust gas 18 is directed to a heat exchanger 32. The hydrocarbon fuel vapor 20 and additional air 30 are combined and passed through heat exchanger 32 to preheat the gases, prior to the gases being introduced into plasma generating device 22. In this method, which is otherwise as described above in connection with FIG. 1, the exhaust gas stream 18a is not introduced into plasma generating device 22, but rather is exhausted out of heat exchanger 32, so that the gas mixture contacted with the plasma in plasma generating device 22 is a mixture of hydrocarbon fuel vapor and air. The plasma promotes a partial oxidation reaction between the fuel vapor and air to form a product gas mixture including carbon monoxide and water. As before, the product gas mixture 34 can be directed into combustion chamber 12 and burned to produce more power and sequester excess oxygen.

Figure 3:
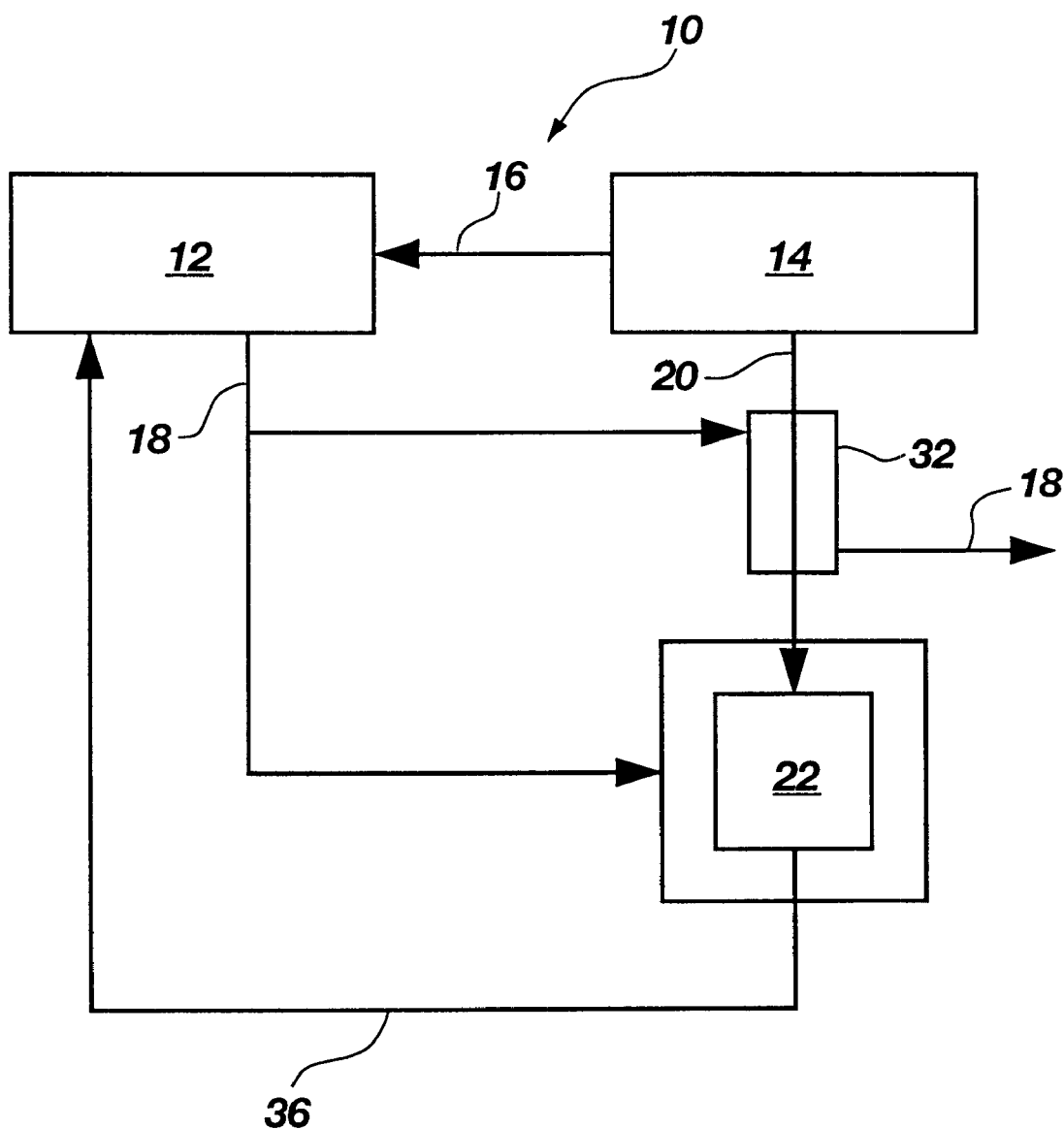
FIG. 3 is a schematic representation of a system and method according to the present invention, wherein hydrogen gas and ultrafine carbon particles are directly produced from fuel vapor.

In another method of the present invention, fuel vapor in an internal combustion engine is plasma-treated to directly produce hydrogen gas, along with solid carbon particles and hydrocarbon gases. Referring now to FIG. 3, wherein like components use the same reference numerals as in FIGS. 1 and 2, hydrocarbon fuel vapor 20 alone, preferably pre-heated in heat exchanger 32, is contacted with a plasma in plasma generating device 22 to form a product mixture 36 including hydrogen gas, solid carbon particles, and various hydrocarbon gases. The product mixture 36 can be directed into combustion chamber 12 and burned to produce more power and to sequester excess oxygen. The method is otherwise as described above in connection with FIGS. 1 and 2.

Although the present methods can be used advantageously with any internal combustion engine burning liquid hydrocarbon fuels, the methods are particularly useful in reducing pollution and increasing efficiency in internal combustion-powered vehicles, such as cars, trucks, boats and the like. In these systems, a small amount of fuel and electricity are taken from the engine system itself to provide the thermal or non-thermal plasma, and the hot engine exhaust gas is used to preheat the plasma gas and/or the plasma device. Thus, the methods can be adapted to be used "on-board" internal combustion-powered vehicles with only minor modifications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of reforming fuel vapor for use in an internal combustion engine, the method comprising:

providing an internal combustion engine comprising a combustion chamber and a fuel tank adapted to provide hydrocarbon fuel to the combustion chamber, the combustion chamber being adapted to combust the hydrocarbon fuel;

directing the hydrocarbon fuel to the combustion chamber and combusting the hydrocarbon fuel in the combustion chamber, thereby forming a high temperature exhaust gas stream directed to exit the combustion chamber, the high temperature exhaust gas stream comprising carbon dioxide and water;

providing a plasma generating device and generating a plasma with the plasma generating device;

preheating at least a portion of the plasma generating device by contacting the plasma generating device with a second portion of the high temperature exhaust stream; and contacting a starting gas mixture comprising air, a first portion of the high temperature exhaust gas stream and a hydrocarbon fuel vapor with the plasma to form a product gas mixture comprising carbon monoxide and hydrogen.

2. A system for treating fuel vapors for use in an internal combustion engine, the system comprising:

an internal combustion engine comprising a combustion chamber and at least a first exhaust gas path for directing high temperature exhaust gases from the combustion chamber to a first location;

a fuel tank adapted to hold hydrocarbon fuel in liquid and vapor form and to provide liquid hydrocarbon fuel to the combustion chamber, the combustion chamber being adapted to combust the liquid hydrocarbon fuel; and a plasma generating device including a plasma chamber, located at the first location, and in fluid communication with the combustion chamber, the at least a first exhaust gas path, and the fuel tank, the plasma chamber of the generating device adapted to form a plasma, to directly receive hydrocarbon fuel in vapor form from the fuel tank for contact with a plasma formed in the plasma chamber, wherein the hydrocarbon fuel in vapor form is obtained by taking hydrocarbon fuel in vapor form directly from the fuel tank and wherein a second exhaust gas path is in communication with the combustion chamber and a housing of the plasma generating device for preheating the plasma chamber of the plasma generating device.

3. The system of claim 2, wherein the plasma generating device is capable of producing a nonthermal plasma.

4. The system of claim 2, wherein the plasma generating device is capable of producing a thermal plasma.

5. The system of claim 2, wherein the second exhaust gas path exits to atmosphere.

6. A method of reforming fuel vapor for use in an internal combustion engine, the method comprising:

providing an internal combustion engine comprising a combustion chamber and a fuel tank adapted to provide liquid hydrocarbon fuel to the combustion chamber, the combustion chamber being adapted to combust the liquid hydrocarbon fuel;

directing the liquid hydrocarbon fuel to the combustion chamber and combusting the liquid hydrocarbon fuel in the combustion chamber, thereby forming a high temperature exhaust gas stream directed to exit the combustion chamber, the high temperature exhaust gas stream comprising carbon dioxide and water and comprising a first portion and a second portion;

providing a plasma generating device and generating a plasma with the plasma generating device;

preheating at least a portion of the plasma generating device by contacting the plasma generating device with the second portion of the exhaust stream; and contacting a starting gas mixture comprising the first portion of the high temperature exhaust gas stream and a hydrocarbon fuel vapor with the plasma to form a product gas mixture comprising carbon monoxide and hydrogen.

7. The method of claim 6, wherein directing the hydrocarbon fuel to the combustion chamber and combusting the hydrocarbon fuel in the combustion chamber comprises directing and combusting a hydrocarbon fuel comprising gasoline.

8. The method of claim 6, wherein directing the hydrocarbon fuel to the combustion chamber and combusting the hydrocarbon fuel in the combustion chamber comprises directing and combusting a hydrocarbon fuel comprising diesel fuel.

9. The method of claim 6, wherein providing a plasma generating device and generating a plasma in the plasma generating device comprises generating a non-thermal plasma.

10. The method of claim 6, wherein providing a plasma generating device and generating a plasma in the plasma generating device comprises generating a thermal plasma.

11. The method of claim 6, further comprising directing at least a portion of the product gas mixture into the combustion chamber for combustion therein.

12. The method of claim 6, further comprising preheating the hydrocarbon fuel vapor prior to the hydrocarbon fuel vapor contacting the plasma.

13. The method of claim 6, wherein contacting a starting gas mixture comprises contacting a starting gas mixture comprising air.

14. The method of claim 6, wherein contacting a starting gas mixture comprising at least a portion of the high temperature exhaust gas stream and a hydrocarbon fuel vapor with the plasma to form a product gas mixture comprising carbon monoxide and hydrogen comprises providing hydrocarbon fuel vapor originating in the fuel tank.

15. The method of claim 6, wherein the plasma generating device has an inner chamber and an outer housing, and wherein the first portion of the high temperature exhaust gas stream is directed to the inner chamber and the second portion of the high temperature exhaust gas stream is directed to the outer housing.

* * * * *